(12) United States Patent
Zambo et al.

(10) Patent No.: US 6,985,907 B2
(45) Date of Patent: Jan. 10, 2006

(54) COMPUTER-IMPLEMENTED METHOD AND SYSTEM FOR ATTRIBUTING APPLICABLE CONDITION CODES TO FIELD CLAIMS

(75) Inventors: Donald James Zambo, Dearborn, MI (US); Joseph Edward Schramek, Dearborn Heights, MI (US); Paul Joseph Ashburn, II, Temperance, MI (US); Paul Hurley, Huntington Woods, MI (US); Robert Stephen Kirka, Brighton, MI (US)

(73) Assignee: Ford Motor Company, Dearborn, MI (US)

( * ) Notice: Subject to any disclaimer, the term of this patent is extended or adjusted under 35 U.S.C. 154(b) by 385 days.

(21) Appl. No.: 10/218,708

(22) Filed: Aug. 14, 2002

(65) Prior Publication Data

US 2004/0034657 A1   Feb. 19, 2004

(51) Int. Cl.
*G06F 17/30* (2006.01)

(52) U.S. Cl. .................. 707/102; 707/104.1; 705/4

(58) Field of Classification Search ............ 707/7, 707/101, 102, 104.1; 705/4

See application file for complete search history.

(56) References Cited

U.S. PATENT DOCUMENTS

| 5,313,388 | A | 5/1994 | Cortis | 707/35 |
|---|---|---|---|---|
| 6,345,257 | B1 | 2/2002 | Jarrett | 705/1 |
| 6,366,199 | B1 | 4/2002 | Osborn et al. | 340/438 |
| 6,510,427 | B1 * | 1/2003 | Bossemeyer et al. | 707/6 |
| 6,578,001 | B1 * | 6/2003 | Schramek | 705/1 |
| 2002/0007237 | A1 | 1/2002 | Phung et al. | 701/33 |
| 2002/0016655 | A1 | 2/2002 | Joao | 701/35 |
| 2002/0072808 | A1 * | 6/2002 | Li | 700/5 |
| 2002/0091706 | A1 * | 7/2002 | Anderson et al. | 707/104.1 |

* cited by examiner

*Primary Examiner*—Leslie Wong
(74) *Attorney, Agent, or Firm*—David B. Kelley; Brooks & Kushman

(57) ABSTRACT

One aspect of the present invention is a computer-implemented method for attributing applicable condition code(s) to a field claim. One preferred method includes inputting a text comment associated with the field claim, inputting a plurality of condition codes and at least four keyword combinations of at least two non-sequential keywords for each condition code, and for each condition code, attributing the condition code as an applicable condition code if at least one keyword combination for the condition code is included in the text comment. The applicable condition code(s) can be relied upon by individuals to at least identify failure mode(s) associated with field claims.

15 Claims, 3 Drawing Sheets

Fig. 3

COMPUTER-IMPLEMENTED METHOD AND SYSTEM FOR ATTRIBUTING APPLICABLE CONDITION CODES TO FIELD CLAIMS

BACKGROUND OF THE INVENTION

1. Field of the Invention

At least one aspect of the present invention generally relates to methods and systems for attributing applicable condition code(s) for field claims and, in particular, to methods and systems for codifying field claims.

2. Background Art

In the automotive industry, as well as other industries, field information is commonly collected and input into a computer database as a part of the process of responding to customer vehicle concerns, i.e., warranty claims and field concerns (collectively referred to as field claims). Field information can include technician text comments provided by a technician that responded to the field claim and customer text comments provided by a vehicle customer detailing the nature of the field claim. Field information can also include other information relevant to the field claim, including, but not limited to: Model Year, Model Name, Model or Style Number, Product Identification or Serial Number, Date of Repair, Size, Supplier of the Part, and State or Province. The typical computer database can include at least about 40,000 field claim records.

Recently, it has become crucially important to analyze field claims, and in particular identify the type and effect of vehicle failure(s) that result in the field claim. Ford Motor Company utilizes the Analytical Warranty System (AWS), in part, to search the text comments (technician and customer) of field claim records to analyze field claims. AWS can execute a filtered search on the text comments for specific keywords. For example, if the keywords are spring and tire, the filter returns the field claim records in which both keywords are included in both the technician and customer text comments.

AWS does not have the ability to identify the type and effect of vehicle failure(s) for field claims. AWS can assign a customer concern code to each field claim. The customer concern code provides a general characterization of repair(s) by customer symptom, but does not provide the technical reason for the repair(s), i.e., brake pedal spongy-air in brake lines, pulls left-caster setting biased left. Consequently, AWS requires that an extra step be performed in order to accomplish this type of analysis. Typically, assessors perform this extra step by analyzing each field claim. For a relatively large database of field claim records, i.e., at least about 40,000 records, this analysis commonly requires a substantial amount of assessors. Since these assessors identify failure modes based on individual interpretations of the text comments, the results are sometimes inconsistent. Additionally, the assessors cannot conduct complex combination word searches on the text comments. Moreover, a substantial amount of computer processing resources is expended by analyzing each warranty claim individually.

A computer-implemented method and system is needed that can identify the type and effect of vehicle failure(s) for field claims using complex word search combinations. The method and system should include the ability to attribute applicable condition code(s) to field claims and codify the field claims with the most severe of the applicable condition code(s).

SUMMARY OF THE INVENTION

One aspect of the present invention is a computer-implemented method for attributing applicable condition codes to a field claim.

One preferred computer-implemented method of the present invention comprises: inputting a text comment associated with a field claim, inputting a plurality of condition codes and at least four keyword combinations of at least two non-sequential keywords for each condition code, and for each condition code, attributing the condition code as an applicable condition code if at least one keyword combination for the condition code is included in the text comment. The applicable condition codes can be relied upon by individuals to at least identify failure modes associated with the field claim.

Another aspect of the present invention is a method of codifying field claims with the most severe of the applicable condition codes. A field claim can be codified with the most severe of the applicable condition codes based on a severity ranking of the plurality of condition codes.

The text comment associated with the field claim can be a technician text comment or customer text comment.

Yet another aspect of the present invention is a computer-implemented system for attributing applicable condition codes to a field claim. The computer-implemented system comprises at least one computer configured to: input a text comment associated with the field claim, input a plurality of condition codes and at least four keyword combinations of at least two non-sequential keywords for each condition code, and for each condition code, attribute the condition code as an applicable condition code if at least one keyword combination for the condition code is included in the text comment. Condition codes can be relied upon by individuals to at least identify failure modes associated with the field claim. The text comment can be a technician text comment or a customer text comment. Another aspect of the present invention is a system for codifying the field claim with the most severe of the applicable condition codes. The at least one computer of the computer-implemented system can be configured to codify the field claim with the most severe of the applicable condition codes based on a severity ranking of the plurality of condition codes.

The above and other objects, features and advantages of the present invention are readily apparent from the following detailed description of the best mode for carrying out the invention when taken in connection with the accompanying drawings.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings which:

FIG. 3 graphically illustrates the implementation of a preferred system in accordance with the present invention.

DETAILED DESCRIPTION OF THE PREFERRED EMBODIMENT(S)

As required, detailed embodiments of the present invention are disclosed herein. However, it is to be understood that the disclosed embodiments are merely exemplary of the invention that may be embodied in various and alternative forms. Therefore, specific functional details herein are not to be interpreted as limiting, but merely as a representative basis for the claims and/or as a representative basis for teaching one skilled in the art to variously employ the present invention.

Figure 1:
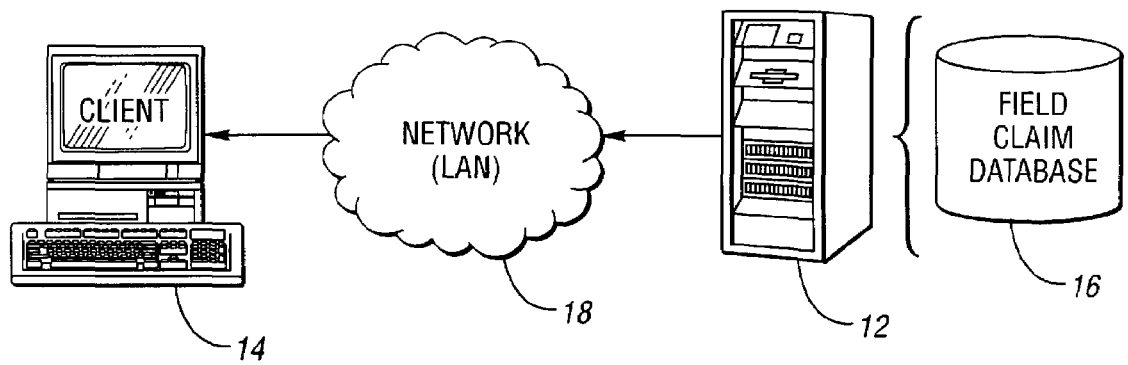
FIG. 1 is a schematic diagram illustrating a preferred embodiment of a system for implementing the present invention.

FIG. 1 is a schematic diagram illustrating a preferred system 10 for implementing the present invention. System 10 comprises at least one server computer 12 operably serving at least one client computer 14 and configured to store information to, and retrieve data from, at least one field claim data base, preferably stored within storage 16.

In accord with a preferred embodiment of the present invention, the at least one server computer 14 communicates with the at least one client computer utilizing a TCP-IP communication via network/LAN 18. Computer network 18 can comprise any one or more of a variety of computer communication configurations including but not limited to a local area network (LAN), a wide area network (WAN), a wireless network, an intranet, and extranet and the Internet.

Figure 2:
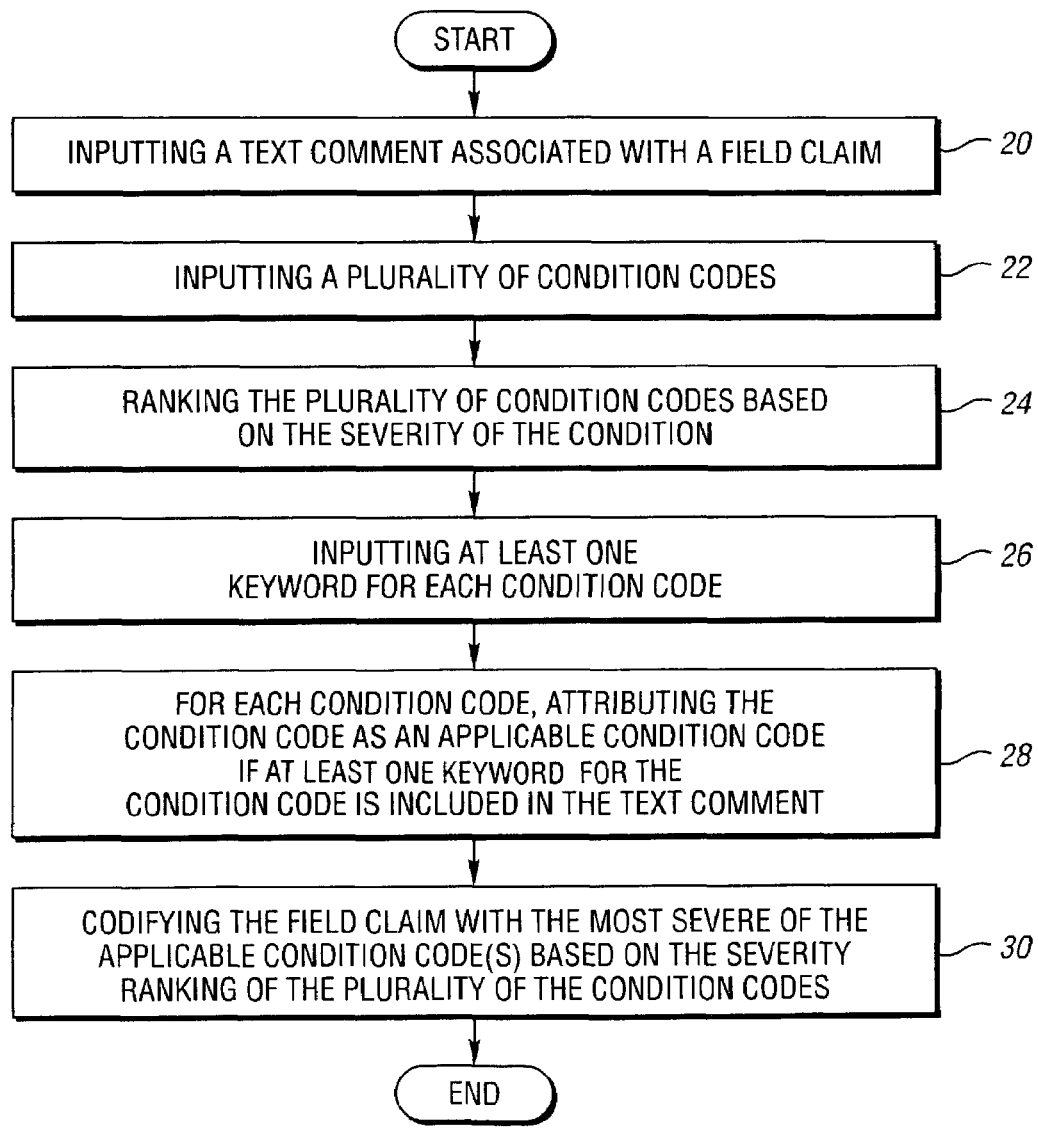
FIG. 2 is a block flow diagram illustrating a preferred embodiment of a method for implementing the present invention.

FIG. 2 is a block flow diagram illustrating a preferred method for implementing the present invention.

As represented in block 20 of FIG. 2, a text comment associated with a field claim is input. Examples of field claims include warranty claims and field concerns. It should be understood that the term field claim is not limited to warranty claims and field concerns, and can extend to claims in other industries, i.e., health and insurance industries. The text comment can be created in conjunction with a technician processing a warranty claim. For example, a vehicle customer can have a limited tire warranty for 12 months or 12,000 miles, whichever comes first. Before the warranty expires, the vehicle customer may experience a problem with the tires that can be fixed under the terms of the warranty. The vehicle customer can bring their vehicle into the dealership and make a warranty claim to have the dealership fix the problem. As part of processing the warranty claim, a dealership technician inputs a text comment into a computer database describing the warranty claim and how the problem was fixed. For example, the text comment for a tire warranty claim can be "Left Rear Tire Sidewall Bulging Defective Tire No Physical Damage Noted Replaced Left Rear Tire, Mount And Balanced All Ok". It should be understood that technicians at vehicle service shops can also input the text comment depending on the particular implementation of the present invention. It should also be understood that field concerns made by vehicle customers can also be used as the basis for the text comment.

The text comment can also be created by the vehicle customer. For example, the vehicle customer's description of the event precipitating a warranty claim or field concern can be input into a computer database. A customer text comment for a tire warranty claim can be "Left Rear Tire Has A Bubble In The Side Wall".

The text comment is preferably stored in computer database 16 as a comma separated variable (CSV) or a data interchange file (DIF).

The computer database may include other field information regarding the field claim, such as, but not limited to: Model Year, Model Name, Model or Style Number, Product Identification or Serial Number, Date of Repair, Size, Part Supplier, and State or Province. The text comment along with the other field information regarding the field claim can be referred to as a field claim record.

As depicted in block 22, a plurality of condition codes can be inputted for a vehicle component or concern. For example, Table 1 identifies conditions codes ("CCs") developed for tires. It should be understood that condition codes can be developed for other vehicle components or concerns, as well, including, but not limited to: aluminum knuckles, brake noise, brake line leak corrosion, engine noise, brake hose, steering noise, front hub and bearing, ignition key, ignition lock cylinder, wiring, and sliding doors.

TABLE 1

| CC | Tire Condition |
| --- | --- |
| TA1 | Entire or partial tread separation |
| TA2 | Sidewall blowout or sudden air loss |
| TA3 | Bubble or bulge in sidewall |
| TA4 | Splits or cracks in sidewall or tread |
| TA5 | Tread chunks missing |
| TA6 | Road hazard damage |
| TA7 | Other structural damage |
| TA8 | Belt shifting or slipping |
| TB1 | Poor traction |
| TB2 | Flat tire or puncture damage |
| TB3 | Vehicle vibration |
| TB4 | Noisy |
| TB5 | Rough ride |
| TB6 | Slow leaks |
| TB7 | Fast tread wear |
| TB8 | Pulls or drifts |
| TB9 | Other |
| TC1 | Tire appearance |
| TC2 | Need alignment |
| TC3 | Stones caught in tread |
| TC4 | Need balance |
| TC5 | Normal tire wear out |
| TC6 | Ozone aging with tire over five years old |

As depicted in block 24, the plurality of condition codes are ranked based on the severity of the condition. Preferably, each condition code is comprised of three characters. The first character preferably indicates the vehicle component or concern, i.e., "T" for tires. The second character preferably indicates a major category associated with the condition. The major categories can be defined to emphasize a condition ranking based on the severity of the condition. For example, the major categories can be "A" (for safety and/or performance conditions), "B" (for functional conditions), and "C" (for degradation and/or cosmetic conditions). The "A" major category receives the most severe condition ranking and the "C" major category receives the least severe condition ranking. The third character indicates a sub-category of the major category. For instance, Table 1 lists seven sub-categories (1–7) for safety and/or performance conditions ("A") of tires ("T"). Preferably, the sub-categories are ranked within the major category based on condition severity, with lowest number having the highest severity within the category. For example, "TA1" is the most severe condition within the "A" category and "TA7" is the least severe condition within the "A" category. As another example, "TA3" is more severe than "TB3". It should be understood that severity rankings for the plurality of condition codes can be created for any vehicle component or concern.

As depicted in block 26, at least one keyword is provided for each condition code. According to one preferred embodiment of the present invention, one or more keywords, i.e., simple keywords, are provided for each condition code. Table 2 lists simple keywords for tire condition codes. It should be understood that the simple keyword can comprise more than one word, i.e., "replace wheel and tire."

TABLE 2

| CC | Keywords |
|---|---|
| TA1 | "tread", "belt", "sep" |
| TA2 | "blow" |
| TA3 | "bubble", "bulge", "sidewall", "side wall" |
| TA4 | "split" |
| TA5 | "chunk", "cleat" |
| TA6 | "chuckhole", "pothole", "crack", "replace wheel and tire", "replace tire and wheel" |
| TA7 | "transport", "haul away", and "transit" |
| TA8 | "belt", "shift", "slip" |
| TB1 | "trac" |
| TB2 | "stuck", "nail", "flat", "puncture", "cut", "hole" |
| TB3 | "out of rou", "vibrat" |
| TB4 | "nois" |
| TB5 | "roug" |
| TB6 | "leak", "valve", "stem", "air", "pressure", "reset" |
| TB7 | "toe", "cupp", "premat", "edge" |
| TB8 | "castor", "cumber", "rotate", "pull", "switch", "cross" |
| TB9 | "align" |
| TC1 | "appear" |
| TC2 | "stone" |
| TC3 | "normal", "worn" |
| TC4 | "ozone" |
| TC5 | "alter" |
| TC6 | "missing tire", "customer satisfaction", refund, "tire(s)", "osp", "replace", "goodwill" |

According to a more preferred embodiment of the present invention, at least four combination of at least two (preferably non-sequential) keywords are provided for each condition code. It should be understood that the keyword can comprise more than one word, i.e., "came off" and two non-sequential keywords refer to there being at least one word, which is not a keyword, between two keywords. Preferably, a first keyword is selected from a first group of keywords and a second keyword is selected from a second group of keywords to provide the combination of at least two keywords. It should be understood that a third, fourth, etc. keyword can be selected from a third, fourth, etc. keyword group, respectively. Table 3 lists the keyword groups for selection of the keyword combinations for tire condition codes.

TABLE 3

| CC | First Keyword Group | Second Keyword Group | Third Keyword Group |
|---|---|---|---|
| TA1 | "tire", "tyre" | "tread", "thread", "entire", "belts", "belt" | "sepa", "sepe", "rip", "peel", "apart", "come off", "came off" |
| TA2 | "tire", "tyre" | "blew", "blow", "burst", "explod" | |
| TA3 | "tire", "tyre" | "bulg", "bubb", "bulgd", "blist" | |
| TA4 | "tire", "tyre" | "split", "crack", "cut" | |
| TA5 | "tire", "tyre" | "miss", "apart", "piece" | "chunk", "cleat", "tread", "threa" |

TABLE 3-continued

| CC | First Keyword Group | Second Keyword Group | Third Keyword Group |
|---|---|---|---|
| TA6 | "tire", "tyre" | "cut", "gash", "damaged", "wheel", "crack", "bent" | "pot", "chuck", "curb" |
| TA6 | "tire", "tyre" | "rim" | "r/r", "replace" |
| TA6 | "wheel and tire", "tire and wheel" | "new", "replace" | |
| TA7 | "tire", "tyre" | "transport", "transit", "haul away" | |
| TA8 | "tire", "tyre" | "belt", "belts" | "shift", "slip" |
| TB1 | "tire", "tyre" | "trac" | |
| TB2 | "tire", "tyre" | "flat", "puncture", "stuck", "bolt", "nail", "screw" | |
| TB3 | "tire", "tyre" | "vibr", "nvh", "diag", "run out", "runout", "out of round", "road test" | |
| TB4 | "tire", "tyre" | "nois" | |
| TB5 | "tire", "tyre" | "roug" | |
| TB6 | "tire", "tyre" | "leak" | "air", "pressure", "low", "bubble", "valve", "stem", "slow", "rim" |
| TB7 | "tire", "tyre" | "worn", "wear" | "premature", "fast", "shoulder", "edge", "corner", "cord", "chord", "cup", "rotate", "excessive" |
| TB8 | "tire", "tyre" | "pull", "cross", "caster", "switch", "free play" | |
| TB9 | "tire", "tyre" | "align" | |
| TC1 | "tire", "tyre" | "appear" | "scrap", "blem", "goug" |
| TC2 | "tire", "tyre" | "stone" | "tread", "thread" |
| TC3 | "tire", "tyre" | "normal", "wear out", "worn out", "worn out", "chord" | |
| TC4 | "tire", "tyre" | "ozon", "crack", "split" | |
| TC5 | "tire", "tyre" | "wrong", "incorrect" | |
| TC6 | "tire", "tyre" | "alter" | "intent", "purpo" |

Focusing on Table 3, an example of a keyword combination for the "TA1" condition code can be "tyre" (selected from the first keyword group), "entire" (selected from the second keyword group), and "sepa" (selected from the third keyword group).

As represented in block 28, for each condition code, the condition code is designated as an applicable condition code if at least one keywords for the condition code is includes in the text comment. It should be understood that the text comment includes a keyword even if the keyword comprises a portion of word(s) in the text comment. For example, if the text comment includes the word "transmission", then "trans" qualifies as a keyword.

As a non-limiting example of the implementation of process step 28, a field claim for a tire repair can have the following technician text comment: "Removed Wheel From Truck Removed Tire From Wheel. Found A Piece Of Wire In between The Rim And Tire Bead Causing Leak. Removed And Remounted Tire Seems To Hold Air Reinstalled Tire And Wheel And Test Drove" and customer text comment (input by a dealership): "Left Inner Dual Tire Flat Off Of Transport".

Using the simple keywords on Table 2 as the search criteria, any condition code applies if at least one of the keywords for that condition code is found in the text comment. Based on the technician text comment, the applicable condition code for the tire field claim is "TB6" since the keyword "air" appears in the technician text comment. Based on the customer text comment, the applicable condition codes for the tire field claim include "TA7" and "TB2" since the keywords "transport" and "flat" appear in the customer text comment, respectively. The applicable condition codes designated by using the simple keywords provide useful information regarding the type and effect of the tire failure. Specifically, "TA7", "TB2", and "TB6" refer to other structural damage, flat tire or puncture damage, and slow leaks. By reviewing the text comments provided for the example, this information accurately reflects the type and effect of the tire failure.

Using the preferred combination keywords on Table 3 as the search criteria, any condition code applies if at least one combination of at least two (preferably non-sequential) keywords (which are from different keyword groups) for that condition code is found in the text comment. This kind of complex word searching with non-sequential keyword combinations cannot be accomplished on a consistent basis, if at all, by assessors reviewing the text comments of field claims. Based on the technician comment, the applicable condition code for the tire field claim is "TB6" since the combination of keywords "tire", "leak", and "rim" appears in the technician text comment. Based on the customer text comment, the applicable condition code for the tire field claim is "TB2" since the combination of keywords "tire" and "flat" appears in the customer text comment. The applicable condition codes attributed by using the keyword combinations provides useful information regarding the type and effect of the tire failure. Specifically, "TB2" and "TB6" refer to flat tire or puncture damage, and slow leaks. By reviewing the text comments provided for the example, this information accurately reflects the type and effect of the tire failure.

It should be understood that the type of keyword search, i.e., simple or combination, used may vary to best fit a particular implementation of the present invention. For example, if the field claims have been pre-screened for the word "tire" (or "tyre"), the singular word search may be preferred since searching for the word "tire" (or "tyre") would be unnecessary. Additionally, field information other than text comments can be searched for particular information to best fit implementation of the present invention.

As represented in block 30, the field claim is codified with the most severe condition code(s) based on the severity rankings of the plurality of condition codes. Table 1 lists the tire condition codes in order of severity from top to bottom. Accordingly, based on the simple search of the technician and customer comments above, the field claim would be codified with the "TA7" condition code. It should be understood that the codifying step can be based solely on either or both the technician text comment or the customer text comment. Based on the combination search of the technician and customer comments above, the field claim would be codified with the "TB2" condition code. It should be understood that the results of the simple and the combination searches can be combined for the codifying step so that the field claim would be codified with the "TA7" condition code.

Figure 3:
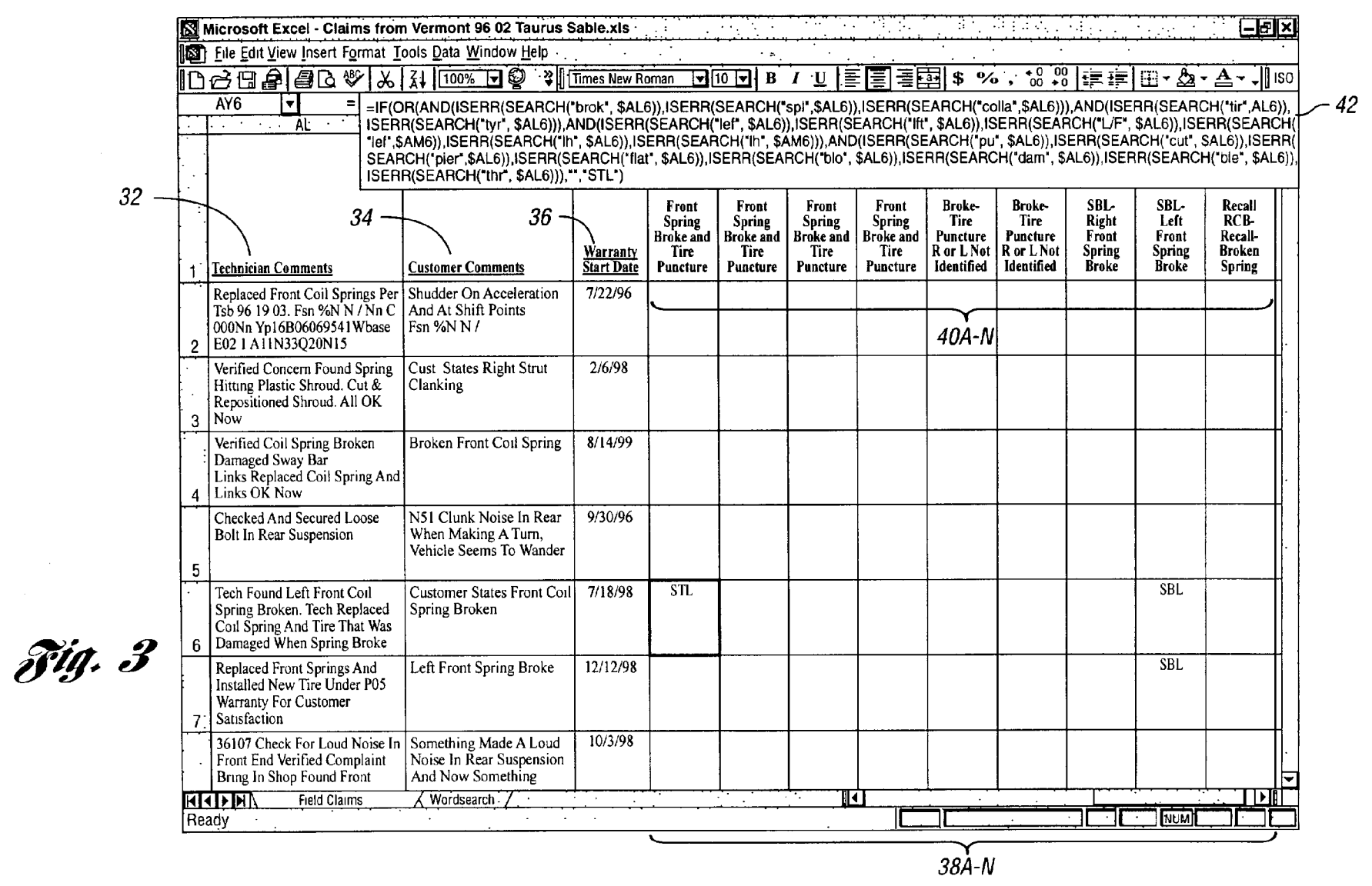

A preferred system of implementing the present invention includes utilizing the Microsoft Excel Spreadsheet Software ("Excel"). FIG. 3 graphically illustrates the implementation of a preferred system in accordance with the present invention. According to FIG. 3, a database of field claims for front spring concern on a specific vehicle model is imported into an Excel spreadsheet. Preferably, the field claim records are imported from a database stored within storage 16 of server computer 14. The technician text comments are imported into column 32 and the customer comments are imported into column 34. Other field information, i.e., warranty start date in column 36, can be imported into the Excel spreadsheet. To the right of the field information, a plurality of columns 38A–N with condition code headings 40A–N are provided. Under each condition code 40, an Excel function is provided for each field claim record. For example, the condition code "STL", referring to the "front spring broke and tire puncture" condition, utilizes function 42 to search the technician and customer text comments of each field claim record for certain keyword combinations. If the technician comment meets the search criteria, the condition code "STL" appears at the intersection of the field claim record row and condition heading. The CONCATENATE function can be used to gather all applicable condition codes and to codify the field claim with the most severe of the applicable condition codes. Once the word searches are created, analyzing the type and effect of failure(s) takes a fraction of the time necessary to do so using multiple assessors that review each field claim manually.

Figure 4:
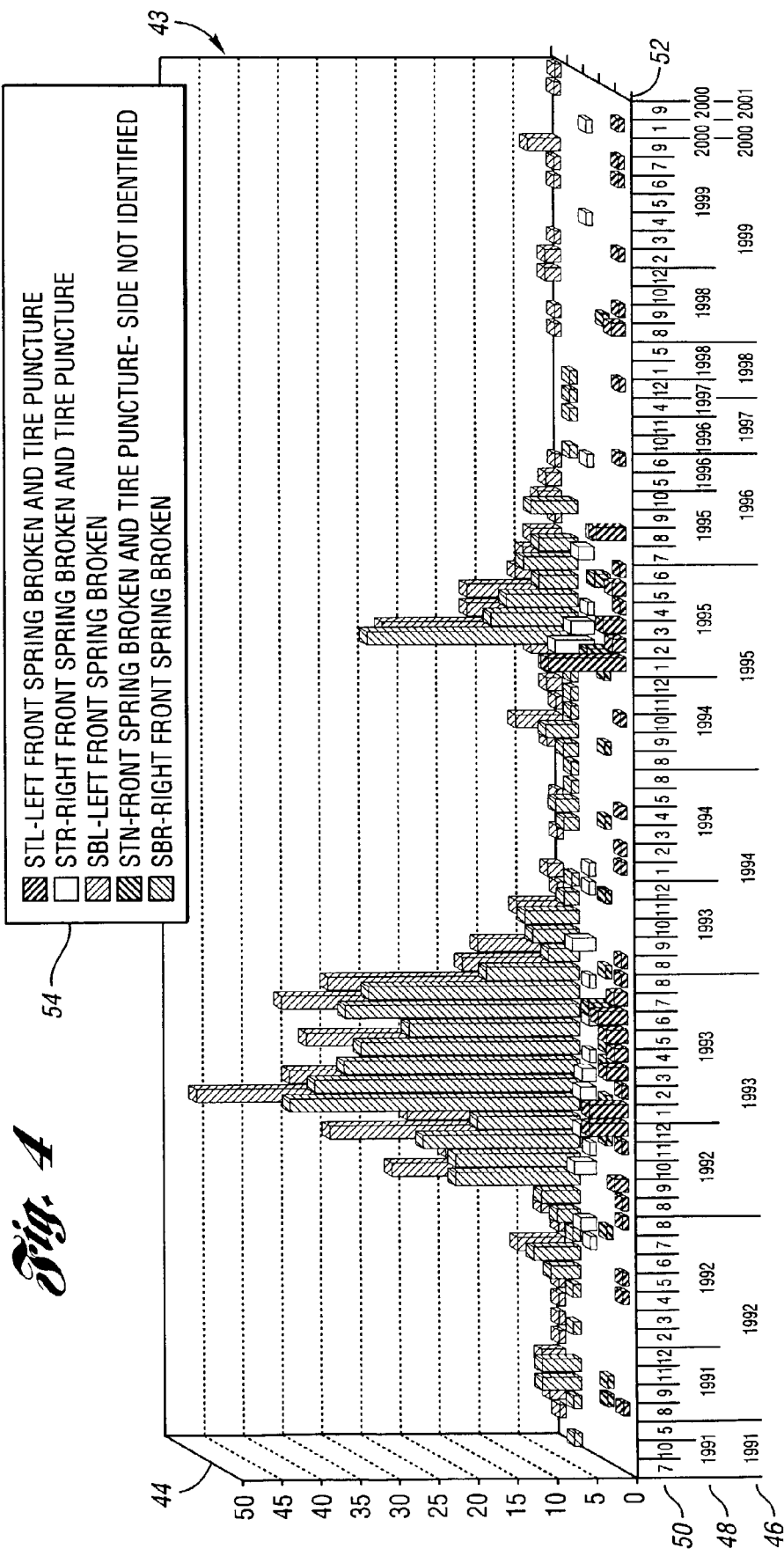
FIG. 4 graphically illustrates the distribution of condition codes as a function of model year, year of production, and month of production for a vehicle model in accordance with a preferred system of the present invention.

Using the Excel Pivot Table function, the distribution of condition codes can be displayed graphically as a function of field information variable(s), such as, but not limited to: Month of Production, Month of Repair, Time In Service, State or Province, Service Part Number, Model Year, Model, Model Name, Model or Style Number, Product Identification or Serial Number, Part Supplier, Engine, Drive Type, and Assembly Plant. FIG. 4 graphically illustrates the distribution of condition codes as a function of model year, year of production, and month of production for a vehicle model in accordance with a preferred system of the present invention. According to FIG. 3, a bar chart 43 is provided representing the number of condition code occurrences on the y-axis 44 as a function of model year 46, year of production 48, and month of production 50, as represented on the x-axis 52. Legend 54 is provided to correlate the individual condition codes with the results shown on bar chart 43.

While the best mode for carrying out the invention has been described in detail, those familiar with the art to which this invention relates will recognize various alternative designs and embodiments for practicing the invention as defined by the following claims.

What is claimed is:

1. A computer-implemented method for attributing applicable condition code(s) to a field claim, the computer-implemented method comprising:
    (a) inputting a text comment associated with the field claim;
    (b) inputting a plurality of condition codes and at least four keyword combinations of at least two non-sequential keywords for each condition code; and
    (c) for each condition code, attributing the condition code as an applicable condition code if at least one keyword combination for the condition code is included in the text comment, the applicable condition code(s) being relied upon by individuals to at least identify failure mode(s) associated with the field claim.

2. The computer-implemented method of claim 1 further comprising ranking the plurality of condition codes based on the severity of the condition.

3. The computer-implemented method of claim 2 further comprising codifying the field claim with the most severe of the applicable condition code(s) based on the severity rankings of the plurality of condition codes.

4. The computer-implemented method of claim 1 wherein the text comment is comprised of a technician text comment.

5. The computer-implemented method of claim 1 wherein the text comment is comprised of a customer text comment.

6. A computer-implemented system for attributing applicable condition code(s) to a field claim, the computer-implemented system comprising an at least one computer configured to:
   (a) input a text comment associated with the field claim;
   (b) input a plurality of condition codes and at least four keyword combinations of at least two non-sequential keywords for each condition code; and
   (c) for each condition code, attribute the condition code as an applicable condition code if at least one keyword combination for the condition code is included in the text comment, the applicable condition code(s) being relied upon by individuals to at least identify failure mode(s) associated with the field claim.

7. The computer-implemented system of claim 6 wherein the at least one computer is additionally configured to rank the plurality of condition codes based on the severity of the condition.

8. The computer-implemented system of claim 7 wherein the at least one computer is additionally configured to codify the field claim with the most severe of the applicable condition code(s) based on the severity rankings of the plurality of condition codes.

9. The computer-implemented system of claim 6 wherein the text comment is comprised of a technician text comment.

10. The computer-implemented system of claim 6 wherein the text comment is comprised of a customer text comment.

11. A computer-readable medium having computer-executable instructions for performing a method comprising:
    (a) inputting a text comment associated with the field claim;
    (b) inputting a plurality of condition codes and at least four keyword combinations of at least two non-sequential keywords for each condition code; and
    (c) for each condition code, attributing the condition code as an applicable condition code if at least one keyword combination for the condition code is included in the text comment, the applicable condition code(s) being relied upon by individuals to at least identify failure mode(s) associated with the field claim.

12. The method of claim 11 further comprising ranking the plurality of condition codes based on the severity of the condition.

13. The method of claim 12 further comprising codifying the field claim with the most severe of the applicable condition code(s) based on the severity rankings of the plurality of condition codes.

14. The method of claim 11 wherein the text comment is comprised of a technician text comments.

15. The method of claim 11 wherein the text comment is comprised of a customer text comment.

* * * * *